United States Patent [19]

Saxe et al.

[11] Patent Number: 6,156,239

[45] Date of Patent: Dec. 5, 2000

[54] LIGHT POLARIZING MATERIALS, LIQUID SUSPENSIONS AND FILMS THEREOF, AND LIGHT VALVES INCORPORATING SAME

[75] Inventors: Robert L. Saxe, New York; Barry Fanning, Patchogue; Robert I. Thompson, deceased, late of Plainview, all of N.Y., by Mrs. Robert I. Thompson

[73] Assignee: Research Frontiers Incorporated, Woodbury, N.Y.

[21] Appl. No.: 09/258,677

[22] Filed: Feb. 26, 1999

Related U.S. Application Data

[60] Provisional application No. 60/076,152, Feb. 26, 1998.

[51] Int. Cl.⁷ .................... F21V 9/14; G02B 5/30; G02B 26/00; C02F 1/01
[52] U.S. Cl. .................... 252/585; 252/583; 359/253; 359/296; 359/322; 359/488
[58] Field of Search .................... 252/582, 583, 252/585; 359/361, 495, 253, 296, 322, 488

[56] References Cited

U.S. PATENT DOCUMENTS

| | | | |
|---|---|---|---|
| 4,698,425 | 10/1987 | Rebek | 544/235 |
| 4,861,564 | 8/1989 | Rebek | 423/21.5 |
| 5,002,701 | 3/1991 | Saxe | 252/586 |
| 5,093,041 | 3/1992 | Check, III et al. | 252/585 |
| 5,130,057 | 7/1992 | Saxe | 252/585 |
| 5,463,491 | 10/1995 | Check, III | 359/296 |
| 5,656,751 | 8/1997 | Tanaka et al. | 540/128 |
| 5,728,251 | 3/1998 | Check, III | 156/307.5 |

*Primary Examiner*—Shean C. Wu
*Attorney, Agent, or Firm*—Greenberg Traurig LLP

[57] ABSTRACT

Polyhalide light-polarizing particles prepared by the process comprising reacting in a suitable liquid (i) elemental molecular iodine, (ii) an inorganic halide, with (iii) a substantially rigid polycyclic precursor compound, wherein:

a. the polycyclic precursor compound has two cyclic structures linked together via an aromatic or heteroaromatic group;

b. the three-dimensional structure of the polycyclic precursor compound has a cavity defined by the two cyclic structures and only one opening into the cavity; and c. polar groups are provided in the outside of the polycyclic precursor compound; and d. one of more chelating group or groups are provided inside the cavity of the precursor group for chelating hydrogen or metal ions.

20 Claims, No Drawings

LIGHT POLARIZING MATERIALS, LIQUID SUSPENSIONS AND FILMS THEREOF, AND LIGHT VALVES INCORPORATING SAME This Application claims priority under 35 U.S.C. 11 9(e) from Provisional Application 60/076,152, filed Feb. 26, 1998.

FIELD OF THE INVENTION

The present invention relates to light-polarizing materials, liquid and set suspensions thereof, films comprising droplets of liquid suspensions and light valves containing such suspensions or films.

BACKGROUND

Light valves have been known for over sixty years for modulation of light. As used herein, a light valve may be described as a cell formed of two walls that are spaced apart by a small distance, at least one wall being transparent, the walls having electrodes thereon usually in the form of transparent conductive coatings. The cell contains an activatable material which may be either a liquid suspension of a plastic film in which droplets of liquid suspension are distributed and encapsulated. The liquid suspension (sometimes herein called a liquid light valve suspension) comprises small particles suspended in a liquid suspending medium. In the absence of an applied electrical field, the particles in the liquid suspension exhibit random Brownian movement, and hence a beam of light passing into the cell is reflected, transmitted or absorbed, depending upon the cell structure, the nature and concentration of the particles and the energy content of the light. When an electric field is applied through the light valve suspension in the light valve, the particles become aligned an for many suspensions most of the light can pass through the cell. Light valves have been proposed for many purposes including, e.g., alpha-numeric displays, television displays, windows, sunroofs, sunvisors, mirrors, eyeglasses and the like to control the amount of light passing therethrough. Light valves of the type described herein are also known as "suspended particle devices" or "SPDs".

For many applications, it is preferable for the activatable material to be a plastic film rather than a liquid suspension. For example, in a light valve used as a variable light transmission window a plastic film in which droplets of liquid suspension are distributed is preferable to a liquid suspension alone because hydrostatic pressure effects e.g., bulging, associated with a high column of liquid suspension can be avoided through use of a film, and the risk of possible leakage can also be avoided. Another advantage of using a plastic film is that in a plastic film the particles are generally present only within very small droplets, and hence do not noticeably agglomerate when the film is repeatedly activated with a voltage.

A type of light valve film made by phase separation from a homogeneous solution is disclosed in U.S. Pat. No. 5,409,734. Light valve films made by crosslinking emulsions are disclosed in U.S. Pat. Nos. 5,463,491 and 5,463,492 assigned to the assignee of the present invention. All of those patents and other patents cited herein and references therein are incorporated herein by reference.

For use in set suspensions such as light-polarizing sheets, sometimes called "sheet polarizers", which can be cut up and formed into polarized sunglass lenses or used as filters, light-polarizing particles can be dispersed or distributed throughout a sheet of suitable film-forming material, such as cellulose acetate or polyvinyl alcohol or the like. See e.g., U.S. Pat. Nos. 2,178,996 and 2,041,138. In these set suspensions, however, the particles are immovable.

THE LIQUID LIGHT VALVE SUSPENSION

The liquid light valve suspension may be any liquid light valve suspension known in the art and may be formulated according to known techniques. The term "liquid light valve suspension" as used herein means a "liquid suspending medium" in which a plurality of small particles are dispersed. The "liquid suspending medium" comprises one or more non-aqueous, electrically resistive liquids in which there is preferably dissolved at least one type of polymeric stabilizer which acts to reduce the tendency of the particles to agglomerate and to keep them dispersed and in suspension.

The liquid light valve suspension of the present invention may include any of the liquid suspending media previously proposed for use in light valves for suspending the particles. Liquid suspending media known in the art are useful herein, such as but not limited to the liquid suspending media disclosed in U.S. Pat. Nos. 4,247,175 and 4,407,565. In general one or both of the liquid suspending medium or the polymeric stabilizer dissolved therein is chosen so as to maintain the suspended particles in gravitational equilibrium.

The polymeric stabilizer when employed, can be a single type of solid polymer that bonds to the surface of the particles but also dissolves in the non-aqueous liquid or liquids of the liquid suspending medium. Alternatively, there may be two or more solid polymeric stabilizers serving as a polymeric stabilizer system. For examples, the particles can be coated with a first type of solid polymeric stabilizer such as nitrocellulose, which in effect, provides a plain surface coating for the particles and one or more additional types of solid polymeric stabilizer that bond to or associated with the first type of solid polymeric stabilizer and also dissolve in the liquid suspending medium to provide dispersion and steric protection for the particles. Also, liquid polymeric stabilizers may be used to advantage, especially in SPD light valve films, as described in U.S. Pat. No. 5,463,492.

As is known, inorganic and organic particles may be used in a light valve suspension, such as mica, metals, graphite, metal halides, polyhalides (sometimes referred to in the prior art as perhalides) of alkaloid acid salts and the like. The particles in the liquid suspension may be light-polarizing, such as halogen-containing light-polarizing materials, e.g., polyhalides of alkaloid acid salts. (The term "alkaloid" is used herein to mean an organic nitrogenous base, as defined in Hackh's Chemical Dictionary, Fourth Edition, McGraw-Hill Book Company, New York, 1969). If a polyhalide of an alkaloid acid salt is used, the alkaloid moiety may be a quinine alkaloid, as defined in Hackh's Chemical Dictionary, supra. U.S. Pat. Nos. 2,178,996 and 2,289,712 refer in detail to the use of polyhalides of quinine alkaloid acid salts. The particles may be light-absorbing or light-reflecting.

Also, the particles may be particles of a hydrogenated polyhalide of a quinine alkaloid acid salt, such as dihydroinchonidine sulfate polyiodide, as described in U.S. Pat. No. 4,131,334, or a light-polarizing metal halide or polyhalide, such as cupric bromide or purpurecobaltchloride sulfate polyiodide, as, e.g., in U.S. Pat. No. 1,956,867.

Other light-polarizing polyhalide particles having advantageous features are described in U.S. Pat. Nos. 4,877,313, 5,002,701 and 5,093,041.

The term "polyiodide" as used herein is used in the conventional sense and also in the same sense as the term "periodide" is used in numerous prior art light valve patents, e.g., see column 1 of U.S. Pat. No. 1,951,664 (Land) entitled "Colloidal Suspensions and the Process of Making Same", to indicate a material which is a reaction product of a precursor compound, which may be a sulfate (or certain other salts as described in U.S. Pat. No. 4,270,841) of heterocyclic nitrogeneous bases with iodine and an iodide. Such reaction products are often called polyiodide compounds. This type of particle is discussed in detail in "The Optical Properties and Structure of Polyiodides" by D. A. Godina and G. P. Faerman published in The Journal of General Chemistry, U.S.S.R. Vol. 20. pp. 1005–1016, (1950). Herapathite, for example, is quinine bisulfate polyiodide, and its formula is given under the heading "quinine iodosulfate" as $4C_{20}H_{24}N_2O_2.3H_2SO_4.2HI.I_4.6H_2O$ in The Merck Index, $10^{th}$ Ed. (Merck & Co., Inc., Rahway, N.J.). For other types of polyiodides, the precursor compound need not be a salt, e.g., see U.S. Pat. Nos. 4,877,313 and 5,002,701. In these polyiodide compounds the iodide is thought to form chains and the compounds are strong light polarizers. The term "polyhalide" is used herein to mean a compound such as a polyiodide, but wherein at least some of the iodine in the iodide may be replaced by another halogen element.

In theory, any type of particle capable of reflecting, absorbing and/or transmitting desired wavelengths of visible light can be used in the liquid light valve suspension provided that the particle can be oriented by an electric or magnetic field. For the purposes of the present invention, however, particles that reflect a substantial amount of visible light can cause objectionable light scatter and are therefore not usually desirable. Particles that absorb light efficiently are preferred.

The shape of the particles used in the light valve suspension should preferably be "anisometric", i.e. the shape or structure of the particle is such that in one orientation the particle intercepts more light than in another orientation. Particles which are needle-shaped, rod-shaped, lath-shaped or in the form of thin flakes, are suitable. Light-polarizing crystals are especially useful because they produce a pleasing visual appearance, but any type of light-absorbing particle, preferably exhibiting very little light scatter, can be employed.

The particles are preferably of colloidal size, that is the particles will have a large dimension averaging about 1 micron or less. It is preferred that most particles have large dimensions less than one-half of the wavelength of blue light, i.e. 2000 Angstroms or less to keep light scatter extremely low.

For intended commercial uses it is necessary that the particles used in a liquid light valve suspension, whether or not incorporated into a film, have great chemical and environmental stability.

Historically, the early liquid light valve suspensions comprised particles of Herapathite, referred to above. However, Herapathite and closely related compounds had poor stability to many chemicals and degraded readily when exposed to either ultraviolet radiation or high temperatures.

Some improvement in stability was observed for particles made from salts of certain alkaloids which, unlike quinine, had been hydrogenated and did not include a methoxy group. See e.g., U.S. Pat. No. 4,131,334.

Other types of polyhalide particles having still better heat stability and not based on alkaloids were disclosed in U.S. Pat. Nos. 4,877,313 and 5,002,701. Also, U.S. Pat. No. 5,516,463 discloses, inter alia, light-polarizing polyiodide particles formed by reacting iodine and calcium iodide with the compound 2,5-dicarboxy-pyrazine dihydrate.

Although the latter type of particle represented a significant advance from prior art particles for use in light valves, its chemical stability was still less than desired. For example, the particles could be readily attacked by water.

Accordingly, a yet more stable type of polyhalide light-polarizing particle is desirable for use in light-polarizing sheets and in liquid suspensions and films for light valves.

SUMMARY OF THE INVENTION

Polyhalide light-polarizing particles are made by reacting in a suitable liquid (i) elemental molecular iodine, (ii) an inorganic halide preferably a hydrohalide acid, with (iii) a substantially rigid polycyclic compound (sometimes hereinafter called the "precursor"), wherein:

a. the precursor compound has two cyclic structures linked together via an aromatic or heteroaromatic group;

b. the three-dimensional structure of the precursor compound has a cavity defined by the two cyclic structures and only one opening into the cavity;

c. polar groups are provided in the outside of the precursor compound, such as on the cyclic structures and/or on the aromatic or heteroaromatic linked group; and d. one or more chelating group or groups are provided inside the cavity of the precursor group for chelating hydrogen or metal ions.

Preferably, the polycyclic compound is a 1,3-disubstituted aromatic cyclohexane imide. Such polycyclic compounds preferably comprise the condensation product, as well as derivatives thereof, of two equivalents of a cyclohexane anhydride acid chloride with one equivalent or an aromatic diamine, as is described in detail in U.S. Pat. Nos. 4,698,425 and 4,861,564. These two patents also describe the use of such compounds as chelating agents, capable of chelating many types of ions. Such compounds are sometimes hereinafter referred to as "Rebek Compounds". For the present invention, hydrogen is the preferred type of ion to be chelated, because of its small size and because of the high chemical stability of polyhalide and polyiodide particles made according to the present invention wherein hydrogen is the chelated ion. We have surprisingly found for the first time that such Rebek Compounds and related compounds can be used as precursors to form such light-polarizing polyhalide particles.

The polyhalide particles of the present invention can be used in liquid suspensions and films for SPD light valves, as well as in set suspensions for use as or in sheet polarizers.

The preferred types of the particles, discussed hereinafter, exhibit great chemical stability when exposed to water, even extremely hot water, a property which can be of substantial importance in achieving long life in an SPD device which is exposed to the atmosphere.

STRUCTURE OF THE POLYCYCLIC PRECURSOR

The precursor compound may be a "Rebek Compound" of formula (I) below

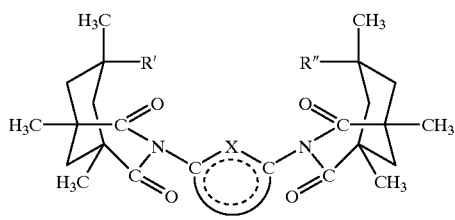

(I)

wherein

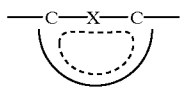

represents a fused or monocyclic, substituted or unsubstituted aromatic or heteroaromatic linker group containing at least one five- or six-membered aromatic or heteroaromatic ring, X is —N—, —CH— or —S—, the dashed line represents the aromatic unsaturation of the ring, and R' and R" are either the same or different and are carboxyl, nitrile, thiocarboxy, amide, amidine, dithiocarboxy or hydroxamic acid moieties; and one or more of the depicted methyl groups may be replaced by a different alkyl or by a polar group, such as hydroxyalkyl, carboxy or the like. Any of the moieties enumerated in U.S. Pat. Nos. 4,698,425 and 4,861, 564 are suitable moieties for R' and R". Examples of the aromatic or heteroaromatic linker group are divalent residues of substituted or unsubstituted, benzene, pyridine, 1,2-4-triazole, purine, pyrimidine, pteridine, quinoline, isoquinoline, indole, imidazole, benzimidazole, napththalene, pyridazine, thiophene, oxazole, thiazole, pyrazole, cinnoline, quinazoline, phthalazine, acridine or phenazine.

In one embodiment of the invention, the Rebek Compound has the formula (II) below

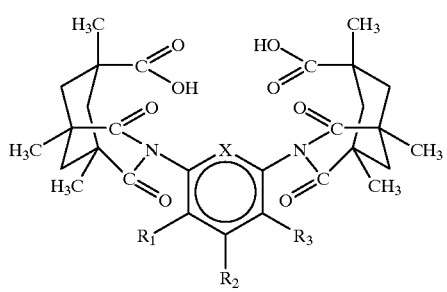

(II)

wherein X is —CH—, R' and R" are as defined above, and $R_1$, $R_2$ and $R_3$ are either H or an organic group having an A value larger than H. The term "A value" refers to the volume of space the electrons of a particular moiety occupy. (Winstein, S.; Holness, N. J., *J. Am. Chem. Soc.* 1955, Vol. 77, pp. 5562, 5578. "A value " is defined as the conformational free energy difference in a monosubstituted cyclohexane.) By way of example, $R_1$, $R_2$ and $R_3$ may be H, alkane, alkyne, alkene, phenyl, aralkyl, carbonyl, ether, thioether, halide, carbocycle or heterocycle, or derivatives thereof. Preferably, $R_1$ and $R_2$ are each a group having an A value larger than H.

A specific embodiment of a Rebek Compound which provides a rigid structure is described in Example 1 of U.S. Pat. No. 4,698,425 and has the formula (III) below:

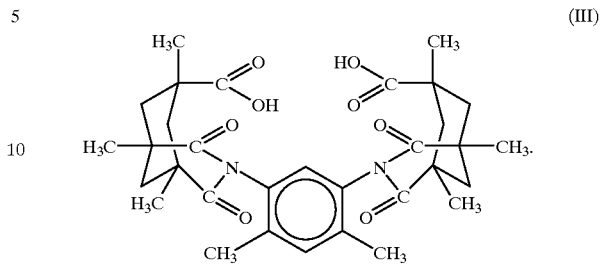

(III)

For convenience, this compound (III) will sometimes be referred to hereinafter as "XDK". The rigidity of the XDK compound is primarily due to the presence of the two methyl groups substituted in the 1 and 5 positions on the central phenyl group which acts as a spacer or linker group between the two substituted cyclohexane rings. The phenyl spacer is connected to each of the substituted cyclohexane rings through non-aromatic imide ring linkages. As described hereinafter similar rigid compounds can be obtained by replacing the aforesaid two methyl groups with other suitable groups.

Although XDK can be used as a precursor and reacted with iodine and a suitable halide e.g. HI, to form light-polarizing polyiodide particles, the fact that this compound has only low polarity methyl groups substituted on its aliphatic cyclohexane and phenyl rings makes it difficult for polymers to bond to polyiodide particles and thus it is difficult to disperse such particles into non-aqueous media for use in SPD liquid suspensions and films.

Therefore, in accordance with the present invention, preferred embodiments of the present invention will have one or more polar groups either directly or indirectly substituted on one or more of the aromatic or cyclohexane rings.

The only light-polarizing particles made from a rigid polycyclic precursor having an internal cavity that are known to use are the dichroic particles described in U.S. Pat. No. 5,656,751. However, the precursor compound for the dichroic particles described in U.S. Pat. No. 5,656,751 is strictly limited to phthalocyanine, phthalocyanine derivatives and phthalocyanine or its derivatives having a central metal introduced therein. Unlike the precursor compounds of the present invention, phthalocyanine comprises four isoindole groups connected to one another by four nitrogen atoms, all four of said isoindole groups comprising only aromatic rings. Moreover, the four interconnected groups in phthalocyanine form a completely connected macrocyclic compound, whereas the polycyclic compounds of the present invention comprise both an aromatic compound acting as a spacer and two aliphatic ring components on different sides of the spacer, with an opening between the two aliphatic rings. In addition, chelation within the phthalocyanine molecule occurs solely between nitrogen atoms whereas within the precursor compounds of the present invention chelation is not limited to chelation between nitrogen atoms only but can occur between one or more types of atoms such as oxygen, nitrogen or sulfur. The large number of rings in the phthalocyanine molecule, eight, comprised of a set of four fused ring units, also tends to make polyiodides made therefrom highly inefficient compared to polyiodides made according to the present invention because generally the ratio of the weight of iodine to non-iodine atoms tends to be much lower.

It should also be noted that U.S. Pat. No. 5,656,751 does not disclose any procedures for making liquid suspensions or films for an SPD light valve or set suspensions for sheet polarizers. The only type of film described in this patent was formed by putting a particle precipitate between a pair of glass plates and subjecting it to shear in one direction. Hence it is unknown as to whether or how the dichroic particles of this patent can actually be used in practical suspensions and/or films.

Methods of making cis,cis-1,3,5-trimethylcyclohexane-1, 3,5-tricarboxylic acid (hereinafter sometimes called "Kemp's Triacid") and its acid chloride anhydride, and its use in making a number of Rebek Compounds, are known in the art. The compounds of formulas (I), (II) and (III) are described in or may be made using methods analogous to those described in U.S. Pat. Nos. 4,698,425 and 4,861,564, which are incorporated herein by reference hereto.

In order to facilitate dispersion of polyhalide particles made form Rebek Compound precursors and the like into an organic liquid we have found it necessary and desirable to directly or indirectly substitute polar groups onto one or more of the cyclohexane rings and/or central aromatic rings. Accordingly, the following examples show how this can be done.

In Example 1 below the compound called "XDK $(OH)_2$" is identical to the XDK compound of formula (III) but with hydroxyl groups substituted for the methyl groups attached at the 1 and 5 positions of the central aromatic ring; the compound called "XDK $(OMe)_2$" is identical to the XDK compound, but with methoxy groups substituted at said 1 and 5 positions. Analogously, in Example 2 below "XDK $(CO_2H)_2$" is identical to the XDK compound but with carboxyl groups substituted at the 1 and 5 positions, and "XDK $(CO_2Me)_2$" is identical to the XDK compound but with $CO_2CH_3$ groups substituted at the 1 and 5 positions.

The present invention is illustrated in terms of its preferred embodiments in the following Examples. In these Examples, all parts and proportions are by weight unless otherwise indicated.

EXAMPLE 1

Preparation of 2,4-bis[cis,cis-2,4-dioxo-1,5,7-trimethyl-3-aza-7-bicyclo[3.3.1]nonanecarboxylic acid]-m-dihydroxybenzene, [XDK(OH)$_2$]

Preparation of XDK(OMe)$_2$:

Kemp's Triacid (6.066 g, 23.5 mmol) was dried by refluxing in xylenes (100 ml) with a Dean-Stark trap to remove the azeotroped water. An excess of thionyl chloride (30 ml, 25.8 mmol) was added to the dry acid and this system allowed to react under reflux for 3 hours. Unreacted thionyl chloride was removed by distillation (b.p., 79° C.) and xylenes (b.p., 137–144° C.) distilled until the reflux vapors were neutral to litmus paper. The reaction was allowed to cool and dry pyridine (100 ml) and catalytic N,N-dimethylaminobenzene (DMAP, 0.094 g., 0.77 mmol) were added to the stirred solution. 1,5-bis(methoxy)-2,4-diaminobenzene (2.035 g., 11.2 mmol) was added as the solid and the system refluxed overnight. Solvents were removed by rotary evaporator and the resulting tan solids were triturated in heptanes to yield the product as a free flowing tan powder. (7.209 g., 95%).

Preparation of XDK(OH)$_2$:

XDK(OMe)$_2$ (3.007 g., 4.9 mmol) was dissolved in dry CHCl$_3$ (65 ml) at room temperature. Trimethylsilyl Iodide (2.2 ml, 12.7 mmol) was added neat over 5 minutes via syringe. The reaction was allowed to stir at room temperature over 2 days at which time the brown reaction mixture was evaporated to dryness. These solids were triturated in heptanes to give an orange freely flowing powder (1.573 g., 55%. This organic solid was dissolved in a minimum of hot acetone and water added to incipient cloudiness. Upon heating to 65°–70° C., the orange solution became colorless at which point it was cooled to 5° C. to effect precipitation of a white crystalline solid. The solids were isolated by filtration, water washed, and air dried. (m.p.~405° C., dec.).

EXAMPLE 2

Preparation of 4,6-bis[cis,cis-2,4-dioxo-1,5,7-trimethyl-3-aza-7-bicyclo[3.3.1]nonanecarboxylic acid]-m-benzenedicarboxylic acid [XDK(CO$_2$H)$_2$]

[XDK(CO$_2$H)$_2$] can be prepared by ester hydrolysis of the condensation product [XDK(CO$_2$Me)$_2$], of dimethyl-4,6-diamino-m-benzenedicarboxylate with Kemp's anhydride acid chloride. Experimental details follow.

Preparation of XDK(CO$_2$Me)$_2$:

2.1 equivalents of Kemp's Triacid was dried by refluxing xylenes with a Dean-Stark trap to remove the azeotroped water. An excess of thionyl chloride was added to the dry acid and this system allowed to react under reflux for 3 hours. Unreacted thionyl chloride was removed by distillation (b.p., 79° C.) and xylenes (b.p., 137–144° C.) distilled until the reflux vapors were neutral to litmus paper. The reaction was allowed to cool and dry pyridine and catalytic N,N-dimethylaminobenzene (DMAP) was added to the stirred solution. Dimethyl-4,6-diamino-m-benzenecarboxylate was added as the solid and the system refluxed overnight. Solvents were removed by rotary evaporator and the resulting tan solids were triturated in heptanes to yield the product as a free flowing tan powder.

Preparation of XDK(CO$_2$H)$_2$:

XDK(CO$_2$Me)$_2$ was dissolved in methanol at room temperature. 2 equivalents of KOH were added and the reaction allowed to stir overnight. The solution was carefully acidified to pH 4 with concentrated HCl and extracted 3 times with chloroform. This chloroform solution was dried with sodium sulfate and filtered. Addition of heptanes precipitated the product which was filtered and dried.

Compounds related to XDK can also be prepared with polar groups substituted on the outside of the cyclohexane rings. For example, in Example 3 below a procedure is disclosed for making a compound like XDK but with six CH$_2$OH groups substituted for the six methyl groups on the two cyclohexane rings of XDK. This derivative of XDK is water soluble. Of course, less than all six of the methyl groups can be replaced with CH$_2$OH groups by adjusting the quantities of reactants in Example 3, and this may be desirable if one does not want the compound to be water soluble.

EXAMPLE 3

Preparation of 2,4-bis[cis,cis-2,4-dioxo-1,5,7-tris (hydroxymethyl)-3-aza-7-bicyclo[3.3.1] nonanecarboxylic acid]-m-xylene This bis(tris(hydroxymethyl)) analog of XDK is prepared by cleavage of the alkyl-benzyl ethers in the corresponding benzyloxy compound which in turn was prepared by condensation of 2,4-diamine-m-xylene with the anhydride acid chloride of cis,cis-1,3,5-tris (benzyloxymethyl)-1,3,5-cyclohexanetricarboxylic acid. Experimental details follow.

cis,cis-1,3,5-tris(benzyloxymethyl)-1,3,5-cyclohexanetricarboxylic acid was prepared according to literature procedures (Kato, Y.; Conn, M.; and Rebek,; J. Am. Chem. Soc., 1994, 116, 3279–3284). This compound was dried by refluxing in xylenes with a Dean-Stark trap to remove the azeotroped water. An excess of thionyl chloride was added to the dry acid and this system allowed to react under reflux for 3 hours. Unreacted thionyl chloride was removed by distillation (b.p., 79° C.) and xylenes (b.p. 137–144° C.) distilled until the reflux vapors were neutral to litmus paper. The reaction was allowed to cool and dry pyridine and catalytic N,N-dimethylaminobenzene (DMAP) was added to the stirred solution. 2,4-diamino-m-xylene was added as the solid and the system refluxed overnight. Solvents were removed by rotary evaporator and the resulting tan solids were recrystallized from ethanol to yield the benzyloxy product.

The benzyloxy compound was dissolved in formic acid and cooled in an ice bath. HBr formed by the action of concentrated sulfuric acid on KBr was bubbled through the solution for 5 minutes to cleave the benzyl ether. Nitrogen was bubbled through the solution for an additional 10 minutes. The solvent was removed from the resulting solids dissolved in methanol and precipitated by the addition of diethyl ether. The bis(tris(hydroxy)) product was filtered and dried.

Examples 1 and 2 hereof describe procedures for making precursor compounds with polar groups on the outside of the aromatic spacer portion of the compound, whereas Example 3 describes a procedure for making precursor compounds having polar groups on the outside of the aliphatic cyclohexane rings. However, this invention also comprises precursor compounds having polar groups on the outside of both the aromatic spacer and cyclohexane rings.

A typical procedure for making the polyhalide crystals (i.e., particles) of the present invention, and liquid suspensions thereof, is presented in Example 4 below. The particles derived from precursors that are not water soluble, are generally exceptionally stable to water, even extremely hot water, a property that is of great importance in promoting a long lifetimes for suspensions and films thereof which are exposed to moisture in the ambient environment.

EXAMPLE 4

Formulation for Making Crystals and a Liquid Suspension of the Polyiodide of a Precursor of the Present Invention In an appropriate size jar add, in the order shown, the following reactants:

| | |
|---|---|
| 15 g. | ¼ sec ss-type nitrocellulose (dry), dissolved In a 200 g. anhydrous Hexyl Acetate (HA) |
| 6 g. | Precursor |
| 4 g. | Iodine |
| 5.28 g. | 67% solution of HI in water |
| 3.50 g. | anhydrous methanol (MEOH) |

Cap jar and shake for approximately ½ hour until solution turns a dark color. Inspect solution under microscope to determine that precursor material is fully reacted.

Centrifuge the solution at 11,500 RPM for 1 hour and discard the supernatant. Drain tubes upside down on paper towel for 15 minutes. Put the sediment from the tubes in a tared glass jar and record the sedimental weight. Add 15 g. anhydrous HA for each gram of sediment. Disperse sediment by shaking for ½ hour followed by 10 hours of sonication.

Centrifuge dispersion of 2500 RPM for 15 minutes and decant and collect supernatant.

Centrifuge supernatant at 9,500 RPM for ½ hour and discard the supernatant. Drain tubes upside down on paper towel for 15 minutes. Collect sediment in a tared glass jar and add 10 g of Anhydrous isopentyl acetate (IPA) for each gram of sediment. Disperse sediment by shaking for ½ hour followed by 10 hours of sonication. This is referred to below as the "initial concentrate".

Plasticizer e.g., tri-n-pentyl-trimellitate (TNPTM) is added to the initial concentrate and the combination placed in a Rotovap apparatus for 2 hours at 40° C. to evaporate the isopentyl acetate. The amount of TNPTM to be added can be determined empirically depending on how concentrated with particles one desires the resulting final concentrate (i.e., the dried initial concentrate) to be. The final concentrate can then be diluted with any other desired solvent or solvents in which the concentrate polymer is soluble to make a liquid suspension.

To prepare a liquid suspension from a concentrate for use in an SPD light valve film, however, in accordance with the teachings of one embodiment of U.S. Pat. No. 5,463,492, instead of adding TNPTM to the abovementioned initial concentrate before evaporating the isopentyl acetate, one can add a liquid polymer such as a copolymer of n-butyl acrylate/heptafluorobutyl acrylate/hydroxyethyl acrylate, and any other desired liquid or liquids.

SPD films incorporating droplets of liquid suspension can be made according to the prior art, e.g., see U.S. Pat. No. 5,463,492, but using the polyhalide particles of the present invention instead of prior art particles. Also, the polyhalide particles of the present invention can be incorporated into set suspensions such as light-polarizing sheets using prior art methods well known in the art. See e.g., U.S. Pat. Nos.: 2,041,138 and 2,178,996.

What is claimed is:

1. Polyhalide light-polarizing particles prepared by a process comprising reacting in a suitable liquid (i) elemental molecular iodine, and (ii) and inorganic halide, with (iii) a substantially rigid polycyclic precursor compound, wherein:

a. the polycyclic precursor compound has two cyclic aliphatic structures linked together via an aromatic or heteroaromatic group;

b. the three-dimensional structure of the polycyclic precursor compound has a cavity defined by the two cyclic aliphatic structures and only one opening into the cavity;

c. polar groups are provided in the outside of the polycyclic precursor compound; and d. at least one chelating group is provided inside the cavity of the precursor group for chelating hydrogen or metal ions.

2. The particles of claim 1, wherein the inorganic halide is a hydrohalide acid.

3. The particles of claim 1, wherein the polar groups are provided on at least one of the cyclic aliphatic structures and on the aromatic or heteroaromatic linked group.

4. The particles of claim 1, wherein the polycyclic precursor compound is a compound of formula (I):

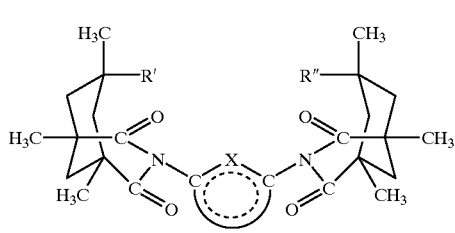

wherein

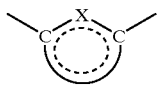

represents a fused or monocyclic, substituted or unsubstituted aromatic or heteroaromatic linker group containing at least five- or six-membered aromatic or heteroaromatic ring, X is —N—, —CH— or —S—, the dashed line represents the aromatic unsaturation of the ring, and R' and R" are either the same or different and are carboxyl, nitrile, thiocarboxy, amide, amidine, dithiocarboxy or hydroxamic acid moieties; and one or more of the depicted methyl groups may be replaced by a different alkyl or by a polar group.

5. The particles of claim 4, wherein the aromatic or heteroaromatic linker group is a divalent residue of substituted or unsubstituted, benzene, pyridine, 1,2-4-triazole, purine, pyrimidine, pteridine, quinoline, isoquinoline, indole, imidazole, benzimidazole, napththalene, pyridazine, thiophene, oxazole, thiazole, pyrazole, cinnoline, quinazoline, phthalazine, acridine or phenazine.

6. The particles of claim 1, wherein the polycyclic precursor compound is a compound of formula (II):

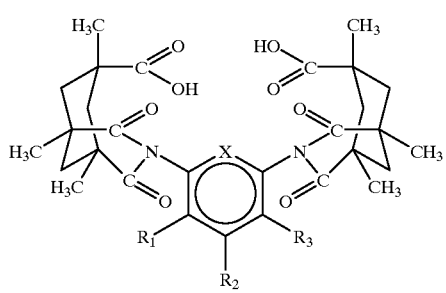

wherein X is —CH—, R' and R" are either the same or different and are carboxyl, nitrile, thiocarboxy, amide, amidine, dithiocarboxy or hydroxamic acid moieties, and $R_1$, $R_2$ and $R_3$ are either H or an organic group having an A value (as defined herein) larger than H.

7. The particles of claim 6, wherein $R_1$, $R_2$ and $R_3$ are H, alkane, alkyne, alkene, phenyl, aralkyl, carbonyl, ether, thioether, halide, carbocycle or heterocycle, or derivatives thereof.

8. The particles of claim 7, wherein $R_1$ and $R_3$ are each a group having an A value larger than H.

9. The particles of claim 1, wherein the polycyclic precursor is a compound of formula (III):

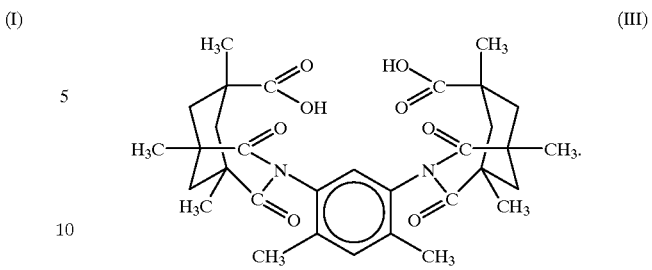

10. A liquid light valve suspension, comprising polyhalide particles of claim 1 suspended in a liquid suspending medium, the liquid suspending medium having a polymeric stabilizer dissolved therein.

11. A light valve, comprising a cell having opposed cell walls and the liquid light valve suspension of claim 9 disposed in the cell between said cell walls.

12. Polyhalide light-polarizing particles prepared by a process comprising reacting, in a suitable liquid, (i) elemental molecular iodine, and (ii) an inorganic halide, with (iii) a compound of formula (I):

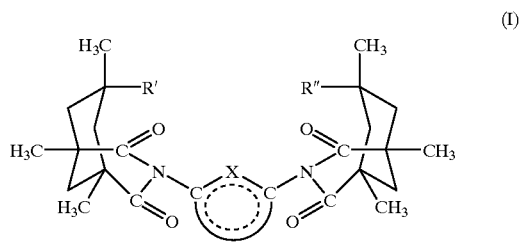

wherein

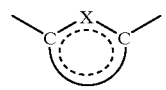

represents a fused or monocyclic, substituted or unsubstituted aromatic or heteroaromatic linker group containing at least one five- or six-membered aromatic or heteroaromatic ring, X is —N—, —CH— or —S—, the dashed line represents the aromatic unsaturation of the ring, and R' and R" are either the same or different and are carboxyl, nitrile, thiocarboxy, amide, amidine, dithiocarboxy or hydroxamic acid moieties; and one or more of the depicted methyl groups may be replaced by a hydrogen, a different alkyl or by a polar group.

13. The particles of claim 12, wherein the aromatic or heteroaromatic linker group is a divalent residue of substituted or unsubstituted, benzene, pyridine, 1,2-4-triazole, purine, pyrimidine, pteridine, quinoline, isoquinoline, indole, imidazole, benzimidazole, napththalene, pyridazine, thiophene, oxazole, thiazole, pyrazole, cinnoline, quinazoline, phthalazine, acridine or phenazine.

14. Polyhalide light-polarizing particles prepared by a process comprising reacting, in a suitable liquid, (i) elemental molecular iodine, and (ii) and inorganic halide, with (iii) a compound of formula (II):

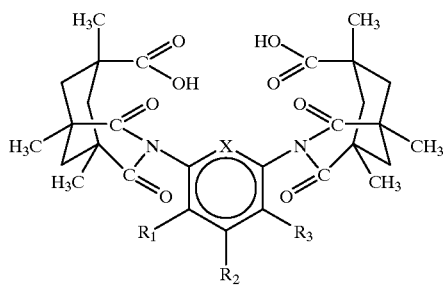

(II)

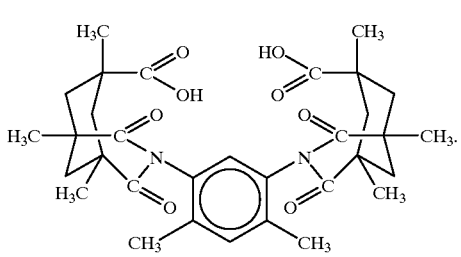

(III)

wherein X is —CH—, R' and R" are either the same or different and are carboxyl, nitrile, thiocarboxy, amide, amidine, dithiocarboxy or hydroxamic acid moieties, and $R_1$, $R_2$ and $R_3$ are either H or an organic group having an A value larger than H.

15. The particles of claim 14, wherein $R_1$, $R_2$ and $R_3$ are H, alkane, alkyne, alkene, phenyl, aralkyl, carbonyl, ether, thioether, halide, carbocycle or heterocycle, or derivatives thereof.

16. The particles of claim 15, wherein $R_1$ and $R_3$ are each a group having an A value larger than H.

17. Polyhalide light-polarizing particles prepared by a process comprising reacting, in a suitable light, (i) elemental molecular iodine, and (ii) an inorganic halide, with (iii) a compound of formula (III):

18. A light valve, comprising a cell having opposed cell walls and the liquid light valve suspension of claim 12 disposed in the cell between said cell walls.

19. A light valve, comprising a cell having opposed cell walls and the liquid light valve suspension of claim 14 disposed in the cell between said cell walls.

20. A light valve, comprising a cell having opposed cell walls and the liquid light valve suspension of claim 17 disposed in the cell between said cell walls.

* * * * *